United States Patent [19]

Flais et al.

[11] 3,871,981

[45] Mar. 18, 1975

[54] IN-SITU OXYGEN DETECTOR

[75] Inventors: Louis R. Flais; Ralph G. Gentle, both of Alliance, Ohio

[73] Assignee: Bailey Meter Company, Wickliffe, Ohio

[22] Filed: July 2, 1973

[21] Appl. No.: 376,053

Related U.S. Application Data

[62] Division of Ser. No. 176,804, Sept. 1, 1971, Pat. No. 3,767,469.

[52] U.S. Cl. ............................................ 204/195 S
[51] Int. Cl. .......................................... G01n 27/46
[58] Field of Search............. 204/195 S, 1 T; 324/29

[56] References Cited
UNITED STATES PATENTS

| | | | |
|---|---|---|---|
| 3,576,730 | 4/1971 | Spacil | 204/195 S |
| 3,597,345 | 8/1971 | Hickham et al. | 204/195 S |
| 3,598,711 | 8/1971 | Flais | 204/195 S |

FOREIGN PATENTS OR APPLICATIONS 37,800    5/1965    Germany........................ 204/195 S Primary Examiner—G. L. Kaplan
Attorney, Agent, or Firm—J. M. Maguire

[57] ABSTRACT

A measuring apparatus having a self-contained reference atmosphere and utilizing thick film thermocouples to measure the operating temperature of the detector cell. An embodiment of the detector is provided with heating means and enclosed so as to be capable of operation in a high velocity varying temperature atmosphere. In another embodiment, the operating temperature of the detector cell is measured by one thick-film thermocouple inside and another outside the closed end of the electrolyte tube of the detector. The outputs of the two thermocouples are electrically parallel connected to provide an average of the two thermocouple readings.

6 Claims, 6 Drawing Figures

IN-SITU OXYGEN DETECTOR

This is a division, of application Ser. No. 176,804, filed 9/1/71 now U.S. Pat. No. 3,767,469.

BACKGROUND OF THE INVENTION

1. Field of the Invention

This invention relates to improvements in apparatus for in-situ detection and continuous measurement of the oxygen content in gases and more particularly to a device for flue gas monitoring having a reference atmosphere which limits oxygen migration if any to the direction of the reference only.

2. Description of the Prior Art

As described in U.S. Pat. No. 3,598,711 titled "Electrochemical Oxygen Analyzer", an oxygen detection cell can be calibrated directly from the Nernst equation which relates the voltage output of the detector cell to a function which is a product of cell temperature and the log of the ratio of oxygen concentration across the cell. By providing an atmosphere of known oxygen concentration on one side of the cell and measuring cell temperature and cell voltage output, the oxygen concentration on the other side of the cell is easily calculated, and the need for calibration with bottled gases of known concentrations is eliminated. Atmosphere or bottled gas of known concentration, however, is still required during operation for use as a constant oxygen partial pressure reference on one side of the cell. The improvement herein eliminates the need for bottled reference gas by providing a self-contained, sealed metal-metal oxide reference system.

One of the principal problems with a sealed reference system including a gaseous mixture is that it is normally susceptible to migration of oxygen through the electrolyte tube causing a change in reference or sample gas oxygen partial pressure. Such a problem is present in the device taught by Kolodney et al. in U.S. Pat. No. 3,481,855 for a liquid metal oxygen monitor. Another problem with cells of the type taught in British Pat. No. 1,081,545, published May 19, 1965, is that sealing of the reference system is done with glass compounds which soften and flow at temperatures much lower than the 1500°F operating temperature of some detectors. Furthermore, the $SiO_2$ in a glass seal reacts with the oxygen in the reference system thus changing the reference oxygen partial pressure to the detriment of cell accuracy and reliability.

Calibration without the need for atmosphere or bottled gases of known oxygen concentration is extremely dependent upon the accurate measurement of cell operating temperature to yield an accurate solution for unknown oxygen concentration. This measurement is complicated by the presence of a temperature gradient which exists across the thickness of the electrolyte tube. One temperature is defined on the outside electrode, and a different temperature is defined on the inside electrode. The problem is further aggravated by the difficulty of obtaining good contact between the temperature sensing means and the electrode temperature being measured. Good contact between the sensor and the area sensed is needed since otherwise the most accurate temperature measuring means will give an inaccurate reading.

SUMMARY OF THE INVENTION

In the accordance with the present invention there is provided a zirconium-oxide tube with a compartively low reference oxygen partial pressure relative to that of the sampled gas, and a metal-metal oxide reference system is sealed inside the tube by a brazed zirconia cap located over its open end. A pair of platinum electrode strips, one inside and the other outside of the tube, overlap in the central area of the closed end of the tube, to provide limited area electrodes of constant temperature to sense the voltage developed across the electrolyte.

Further in accordance with the invention, a thick-film thermocouple in molecular contact with the electrolyte tube senses the outside electrode temperature.

Further in accordance with the invention, temperature gradients across the thickness of the zirconia tube are eliminated to provide an in-situ detector for high velocity atmospheres of flucatuating temperature by enclosing the electrolyte tube so as to leave only the closed end of the tube accessible to the unknown oxygen atmosphere. A first heating means in the enclosure heats a part of the lengh of the electrolyte tube near the closed end, and a second heating means in the enclosure opposite the closed tube end heats the unknown atmospheres as well as the closed end of the tube.

Further in accordance with the invention, electrode operating temperatures are sensed by two thick-film thermocouples, one sensing the external electrode temperature and the other sensing the internal electrode temperature, in situations where there is a significant temperature gradient across the thickness of the zirconia tube. The thermocouples are electrically connected to provide an average of the two temperatures sensed thus giving a good indication of the average cell operating temperature. The platinum electrode may serve as one thermoelement of the thick-film thermocouple thus functioning in a dual capacity. The other thermoelement of the thick-film thermocouple may be one of a number of other elements consisting of gold, iridium, palladium, and $MoSi_2$. An alloy of Pt and Rh may also be used such as 90% Pt - 10% Rh or 87% Pt-13% Rh.

This invention eliminates the effects of oxygen migration by providing a sealed reference inside of the electrolyte tube having a lower oxygen partial pressure than that of the oxygen partial pressure outside the tube so that oxygen migration is only possible toward the reference side. This invention also teaches that a free metal is provided to react with the migrating oxygen and form the metal oxide thereby maintaining a constant predetermined oxygen content in the reference.

The invention also provides a high temperature seal able to withstand 1500°F operating temperatures. This is accomplished by brazing a zirconia cap on the open end of the zirconia electrolyte tube after the reference system is inserted therethrough.

The invention herein solves the temperature measurement problem by providing an average reading of cell wall temperatures where a temperature gradient is prevalent thus obviating the need to locate a thermocouple inside of the cell wall. This is accomplished by sensing internal and external wall temperatures at the electrodes with thermocouples and electrically connecting the thermocouple outputs in parallel to give an average reading of the cell operating temperature.

The invention also provides a means of eliminating the gradient across the wall of the electrolyte cell to cancel the associated thermoelectric voltage effects by a unique enclosure and heating system which provides one set of heaters for the body of the electrolyte tube and another set for the closed end of tube and the atmosphere in contact with it.

The invention also solves the problem of accurate cell temperature measurement by the use of a thick-film thermocouple which is in molecular contact with the sensed surface.

The simultaneous use of the platinum electrode of the detector as an electrode and also as one thermoelement of the thick-film thermocouple is also an important feature.

The principal object of the invention, therefore, is to provide an in-situ oxygen detector which does not require either access to atmosphere or bottled gas for calibration or for the reference system and which gives sustained accurate readings of oxygen content in an unknown gas because of improved temperature sensing methods and elimination of temperature gradients.

DESCRIPTION OF THE PREFERRED EMBODIMENTS

Figure 1:
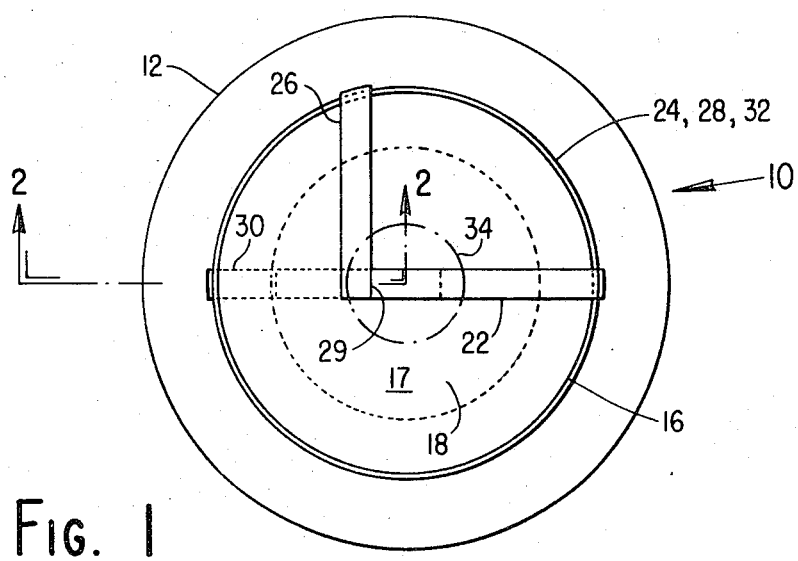
FIG. 1 is a top view representation of an in-situ oxygen detector utilizing a thick-film thermocouple and sealed reference atmosphere.
Figure 2:
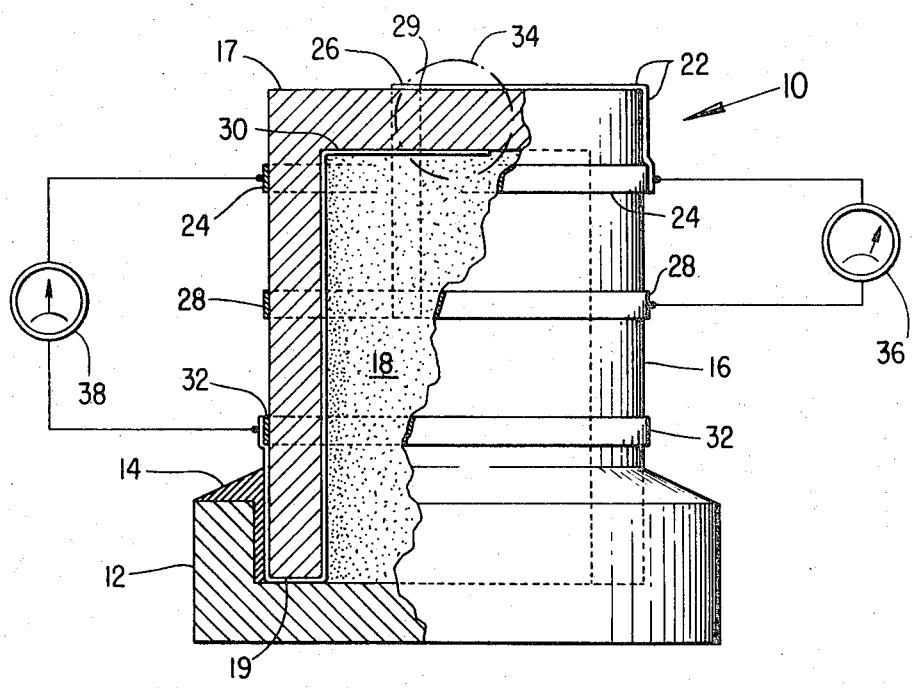
FIG. 2 is a cross-sectional elevational view taken along section 2—2 of the in-situ oxygen detector of FIG. 1 rotated 90° out of the plane of the paper.

Referring to FIGS. 1 and 2, a self-contained reference sensor cell 10 comprises a zirconium-oxide electrolyte tube 16 having a closed end 17, the central portion of which locates a region of overlapping electrodes 34. The overlapping electrodes along with the intervening zirconium-oxide tube forms an oxygen concentration cell. The overlapping electrodes include a platinum electrode strip 22 on the outside of the tube and a platinum electrode strip 30 inside the tube. The outside strip 22 extends partially across the outside of the electrolyte closed end 17 and continues along the outside length of the electrolyte tube 16 terminating in electrical contact at an electrode contact band 24. The inside strip 30 extends partially across the inside of the electrolyte closed end 17 an continues along the full inside length, over the open end and partially over the outside length of the electrolyte tube 16 terminating in electrical contact at an electrode contact band 32.

On the outside of the electrolyte closed end 17 there is formed a thick-film thermocouple having a gold thermoelement 26, and the platinum electrode strip 22 is used as the other thermoelement of dissimilar metal. For the purposes of this disclosure, a thick-film thermocouple is appproximately from 0.1 to 1.0 mils thick and is applied to the surface whose temperature is to be measured as a paste which is then fired in an oven to obtain metallic charactertistics. A paste typical of the one described is manufactured and may be obtained from Englehard Industries. The gold thermoelement 26 extends perpendicular and partially across the electrolyte closed end 17 to join the end of the outside electrode strip 22 and form a thick-film thermocouple junction 29 there. The gold thermoelement then continues along the outside length of the electrolyte tube 16 to electrically contact a gold thermoelement contact band 28. A refractory film such as $SiO_2$ may be used to electrically isolate the gold thermoelement from electrical contact with the contact band 24.

The inside of the electrolyte tube 16 is filled with a metal-metal oxide, reference system 18, such as copper-copper oxide, through the tube open end 19 which is thereafter sealed by brazing a zirconium-oxide cap 12 to the electrolyte tube 16 with a high temperature braze alloy 14 such as cupric oxide-silver, silver-copper-palladium, gold-palladium, nickel-titanium, or other commercial nickel alloys.

In operation, the sensor 10 is directly inserted into a high constant temperature atmosphere of unknown oxygen content. The sensor operates as an oxygen concentration cell whose open circuit voltage output is given by the Nernst equation below:

$$E = (RT/4F) \ln (P_2O_2/P_1O_2)$$

Where:
$E$ = open-circuit potential (volts)
$F$ = Faraday number (96,500 coulombs)
$4F$ = quantity of charge transferred per mol of $O_2$ passing through the electrolyte (386,000 coulombs/mol)
$R$ = universal gas constant (8.314 watt-sec/°K mol)
$T$ = absolute temperature of cell (°K)
$P_1O_2$, $P_2O_2$ = partial pressure of oxygen in the two cell chambers In the detector described, the overlapping electrodes and intervening zirconium-oxide form the oxygen concentration cell. Thus when there is a different oxygen concentration on the outside of the electrolyte closed end 17 from that on the inside of the closed end 17, a voltage potential E will be seen on a voltage indicator 38 connected across the electrode band 24 and the electrode band 32.

A temperature sensing means, regardless how accurate, will give an inaccurate reading if there is relatively poor contact between itself and the surface being measured. The gold-platinum thick-film thermocouple as described herein provides molecular contact between the electrolyte closed end 17 and the gold and platinum thermoelements 26, 22 respectively. Consequently the temperature sensed by the thermocouple junction 29 is an extremely accurate temperature measurement, representative of the cell operating temperature T in the Nernst equation. A temperature indicator 36 connected across the electrode contact band 24, here serving also as the contact band for the platinum thermoelement of the thick-film thermocouple, and a contact band 28, connected to the gold thermoelement 26, provides a means of continually indicating this coil temperature T.

The sealed metal-metal oxide reference system 18 provides a constant oxygen partial pressure for a specific cell temperature T as determined by the metal-metal oxide equilibrium. More specifically, a copper-cuprous oxide reference system will provide an oxygen partial pressure of $10^{-8.83}$ atmospheres at 800°C. This partial pressure will be maintained even if there is a migration of oxygen through the electrolyte tube into the reference system 18 since the migrating oxygen will react with the metal of the reference system to form the oxide and maintain the oxygen partial pressure constant. Since the oxygen partial pressure of the reference system 18 is lower than that outside of the electrolyte tube 16, notwithstanding that the differential pressure may be contra thereto in certain applications, oxygen migration is exclusively unidirectional toward the reference system 18.

The cell operating temperature T is accurately measured and the oxygen partial pressure on the one side of the cell kept constant; the voltage of indicator 38 becomes a direct reading instrument for the oxygen partial pressure of the unknown atmosphere outside of the electrolyte tube 16. Any requirement for bottled gas of known oxygen concentration is obviated since it is necessary neither for calibration nor to keep a constant oxygen partial pressure on one side of the cell.

Figure 3:
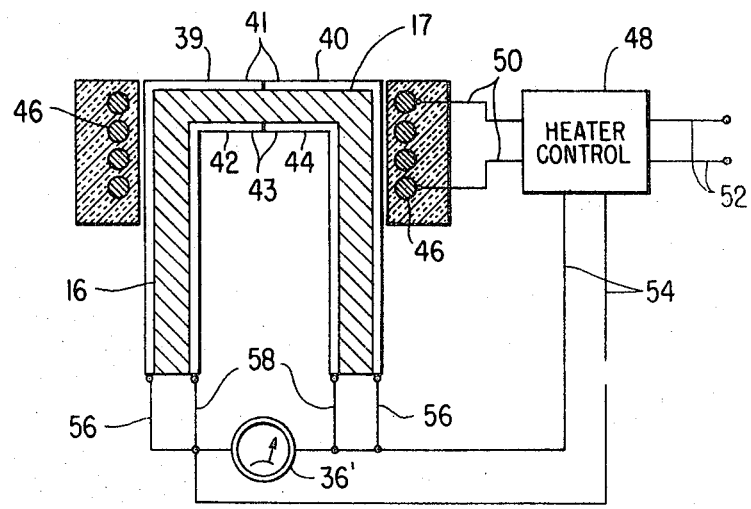
FIG. 3 is a schematic of a system for controlling the temperature of an electrolyte cell using internal and external thick-film thermocouples.

Refer now to the system of FIG. 3 and assume the electrolyte tube 16 is subjected to a significant temperature gradient across the closed end 17. The temperature sensed by a thermocouple on the outside of the electrolyte tube 16 is a high reading and a thermocouple on the inside is a low reading. Neither reading taken alone is a good representation of the oxygen concentration cell operating temperature. An accurate temperature reading of the cell is needed. A thick film thermocouple 41 having a platinum thermoelement 40 and a gold thermoelement 39 is bonded to the outside of the electrolyte tube 16 and a thick-film thermocouple 43 having a platinum thermoelement 44 and a gold thermoelement 42 is bonded to the inside of the electrolyte tube 16 opposite the thermocouple 41. The outputs of the inside and outside thermocouples are parallel-connected to a temperature indicator 36' through thermocouple output lines 58, 56. Through this electrical connection the reading of the indicator 36' is the average of the temperatures sensed by the thermocouples 41, 43. This indication of the average cell operating temperature is transmitted along input lines 54 to a heater control 48 which operates a supplementary heater 46 for the electrolyte tube through heater power lines 50. The heater control 48 is supplied by power supply lines 52. This heater is used in atmospheres of low or fluctuating temperature.

In operation the heater control has a set point temperature against which the average temperature signal of the electrolyte cell is compared. If this temperature reading of the cell is below the set point, the heater control activates the heater 46 until the temperatures are equalized.

Figure 3A:
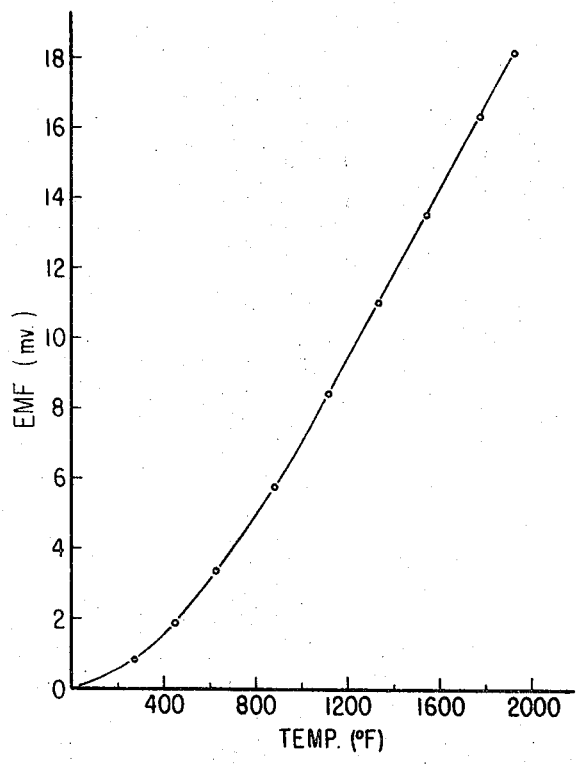
FIG. 3(a) is a chart representation of a gold, platinum thick-film thermocouple voltage output as a function of the thermocouple's junction temperature.

Referring now to FIG. 3a, it should be noted that the voltage output vs temperature curve for the gold-platinum thick-film thermocouple is practically linear beyond 600°F. Since the oxygen concentration cell is operated at temperatures in excess of 600°F, this type of thermocouple becomes particularly applicable and accurate.

Figure 4:
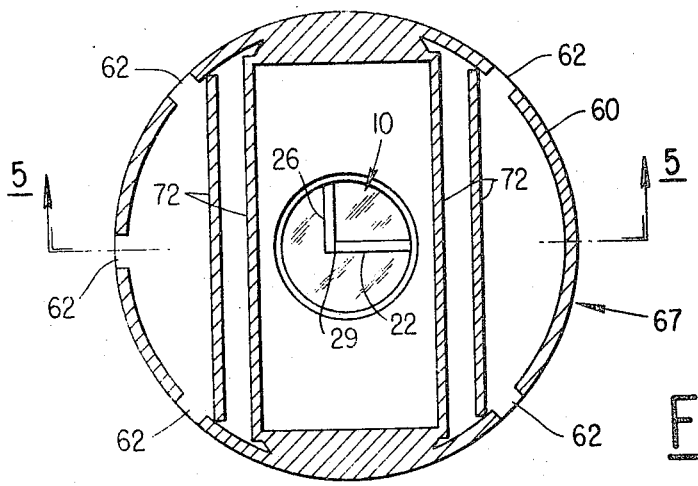
FIG. 4 is a top view representation of a jacketed in-situ oxygen detector for atmospheres of high velocity and varying temperature taken along section 4—4 of FIG. 5.
Figure 5:
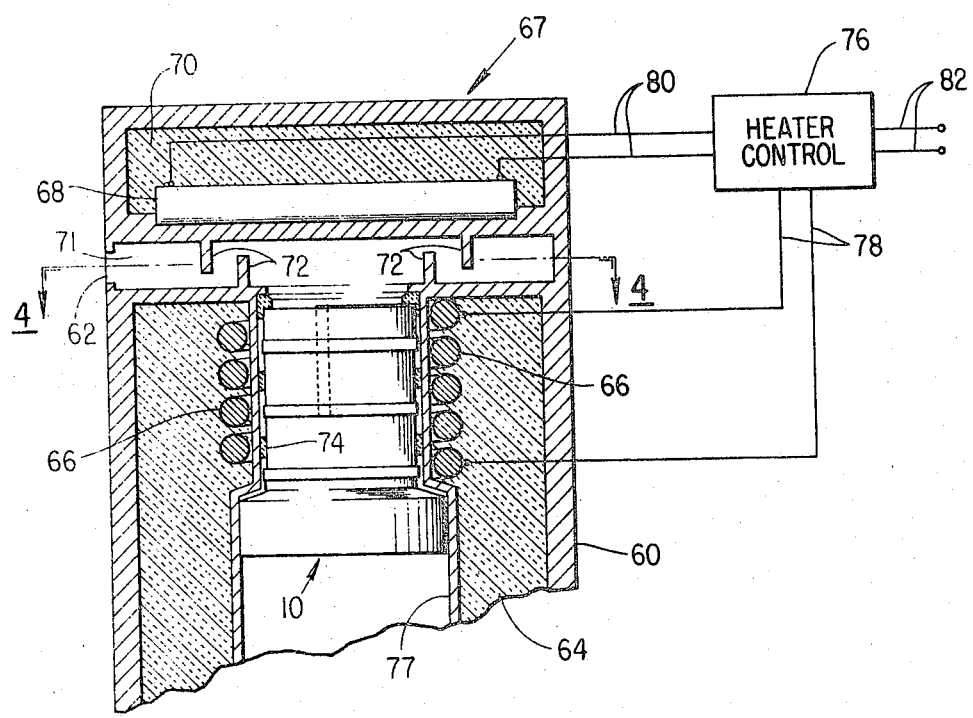
FIG. 5 is a cross-sectional view taken along section 5—5 of the jacketed oxygen detector of FIG. 4 rotated 90° out of the plane of the paper.

Referring now to FIGS. 4 and 5, a jacketed sensor assembly 67 is shown having unknown atmosphere passageways 62 in a detector jacket 60. Parallel flow throttling baffles 72 are shown inside the assembly 67 to enclose the sensor cell 10. The sensor cell 10 is retained inside the jacket 60 so as to have its closed end 17 exposed to the unknown atmosphere chamber 71 and the length of its body sealed inside the jacket 60 by a labyrinth of seals 74. The closed end 17 portion of the electrolyte tube is maintained at a constant temperature by a circumferential electrolyte heater 66 which is located circumferentially outside the jacket inside wall 77. This heater 66 is insulated from the detector jacket 60 by Kaowool heater insulation 64 within the interior space therein. The atmosphere chamber 71 is maintained at operating temperature by an end heater 68 which is also insulated from the jacket 60 by Kaowool insulation 70. The circumferential heater 66 and the end heater 68 are controlled by a heater control 76 through control lines 78, 80 respectively. Power to the heater control 76 is supplied through control power lines 82.

In operation, the jacketed assembly 67 is extended into an atmosphere of unkown oxygen concentration. The atmosphere is able to enter and exit the atmosphere chamber 71 through passageways 62. Once inside the chamber 71 the entering air stream is throttled by the baffles 72 which even out air flow and enhance air stream contact with the closed end 17 of the electrolyte tube 16 forming the oxygen concentration cell. The air stream temperature is maintained constant by the end heater 68 providing supplemental heat when necessary to bring the air stream up to operating temperature. Meanwhile, the circumferential heater 66 is maintaining the electrolyte closed end 17 at a constant operating temperature by supplying heat to the electrolyte tube to maintain the operating temperature. Because the electrolyte tube is insulated and uniformly heated and the air stream entering the chamber 71 is being preheated and throttled, the temperature gradient across the closed end 17 and the accompanying thermoelectric effects are substantially eliminated. Thus this type of insitu detector is extremely well adapted to sense oxygen content in high velocity, atmospheres of varying temperature.

Various modifications will become obvious to persons skilled in the art upon reading this specification. As an example of an obvious modification, the system of inside and outside thermocouples could be modified to provide a signal upon attaining a certain minimal differential temperature thus showing that the $O_2$ cell has stabilized and is ready for operation. Also the temperature sensing signal may be fed through an analog multiplier and into a summing circuit with the detector cell output to directly compensate for the temperature variations of the detector cell. It is our intention that such various modifications also be incorporated.

What we claim as new and desire to secure by Letters Patent of the United States is:

1. An in-situ oxygen detector comprising
   an electrolyte tube of zirconium - oxide formed so as to have one end open and one end closed;
   a first porous platinum electrode strip bonded to the outside of said tube, extending partially across the closed end and continuing along the side of said tube to a first contact terminal on the outside of said tube;
   a second porous platinum electrode strip bonded to the inside of said tube, extending partially across the closed end of said tube so as to overlap said first electrode and continuing along the inside, over the open end and partially on the outside of said tube to a second contact terminal on the outside of said tube;

means sealing the open end of said tube including a zirconia cap;
a self-contained reference atmosphere sealed inside said tube by said sealing means;
a first thermocouple located on the outside closed end of said electrolyte tube so as to detect the temperature of said first electrode; and
a second thermocouple located on the inside closed end of said electrolyte tube so as to detect the temperature of said second electrode.

2. An in-situ oxygen detector as set forth in claim 1 wherein said first and second electrode strips overlap in the central portion of the closed end of said tube so as to form an electrode pair for ion conduction on the center of the closed end of said tube.

3. An in-situ oxygen detector as set forth in claim 2 wherein said self-contained reference atmosphere includes a metal-metal oxide powder, said metal reacting with any oxygen migrating through said zirconium-oxide tube to form the metal oxide and thereby maintaining said reference atmosphere's oxygen partial pressure constant.

4. An in-situ oxygen detector as set forth in claim 3 wherein said sealing means includes the brazing of said zirconia cap to said electrolyte tube with a braze alloy capable of maintaining said brazed seal at 1500°F ambient temperature.

5. An in-situ oxygen detector as set forth in claim 1 wherein said first and second thermocouples are thick-film thermocouples from 0.1 to 1.0 mils thick 6. An in-situ oxygen detector as set forth in claim 1 including:
means for enclosing said electrolyte tube so as to leave the closed end of said tube exposed to an atmosphere of unknown oxygen content;
a first means for heating a portion of the enclosed length of said electrolyte tube near the closed end of said tube, said first heating means being located along the length of said tube and internal to said enclosing means;
a second means for heating the unknown atmosphere and the closed end of said tube located opposite the closed end of said tube; and
means for controlling said first and second heating means so that the temperature sensed by said first and second thermocouples is maintained at a substantially indentical temperature level.

* * * * *